US010521161B2

(12) United States Patent
Yoshida et al.

(10) Patent No.: US 10,521,161 B2
(45) Date of Patent: Dec. 31, 2019

(54) INFORMATION PROCESSING DEVICE, COMMUNICATION SYSTEM, AND RECORDING MEDIUM STORING INSTRUCTIONS

(71) Applicants: Shogo Yoshida, Tottori (JP); Shikou Miyamoto, Kanagawa (JP)

(72) Inventors: Shogo Yoshida, Tottori (JP); Shikou Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/116,198

(22) Filed: Aug. 29, 2018

(65) Prior Publication Data

US 2019/0102119 A1    Apr. 4, 2019

(30) Foreign Application Priority Data

Sep. 29, 2017  (JP) .................................. 2017-192104
Jun. 11, 2018  (JP) .................................. 2018-111382

(51) Int. Cl.
*G06F 3/12*     (2006.01)
*G06F 17/21*    (2006.01)
*G06F 17/24*    (2006.01)

(52) U.S. Cl.
CPC .......... *G06F 3/1206* (2013.01); *G06F 3/1227* (2013.01); *G06F 3/1247* (2013.01); *G06F 3/1288* (2013.01); *G06F 3/1297* (2013.01); *G06F 17/217* (2013.01); *G06F 17/241* (2013.01)

(58) Field of Classification Search
CPC .... G06F 3/1206; G06F 3/1227; G06F 3/1297; G06F 17/217; G06F 17/241; G06F 3/1247; G06F 3/1288
USPC ........................................................ 358/1.15
See application file for complete search history.

(56) References Cited

U.S. PATENT DOCUMENTS 8,572,480 B1 * 10/2013  Goodwin ............ G06F 17/2229
                                                      382/173
2004/0196501 A1 * 10/2004 Silverbrook ............ G06F 3/014
                                                      358/1.15
2005/0179926 A1 *  8/2005 Nishikawa ............ G06F 3/1205
                                                      358/1.13

(Continued)

FOREIGN PATENT DOCUMENTS

JP       2004-287763       10/2004
JP       2004-348498       12/2004

(Continued)

*Primary Examiner* — Allen H Nguyen
(74) *Attorney, Agent, or Firm* — Harness, Dickey & Pierce, P.L.C.

(57) ABSTRACT

An information processing device, a communication system, and a recording medium storing a plurality of instructions. The information processing device and a method caused by the instructions includes generating a second document file from a first document file including data of a plurality of pages, where data of each page in the plurality of pages is arranged in page order and identification information for identifying a boundary of data of each page is included, and transmitting the second document file to an image forming apparatus. The communication system includes the information processing device and the image forming apparatus.

20 Claims, 15 Drawing Sheets

(56) References Cited

U.S. PATENT DOCUMENTS

| | | | | |
|---|---|---|---|---|
| 2008/0259387 A1* | 10/2008 | Hirai | .................. | H04N 1/00222 358/1.15 |
| 2009/0303550 A1* | 12/2009 | Hirabayashi | .............. | G06T 9/00 358/448 |
| 2010/0011287 A1* | 1/2010 | Osaka | ................... | G06F 17/212 715/251 |
| 2010/0241951 A1* | 9/2010 | Vandervort | ......... | G06F 17/2775 715/239 |
| 2016/0148082 A1* | 5/2016 | Bozier | .................... | G06T 11/60 358/1.13 |

FOREIGN PATENT DOCUMENTS

| | | |
|---|---|---|
| JP | 2004-348622 | 12/2004 |
| JP | 2006-041938 | 2/2006 |

\* cited by examiner

FIG. 5

```
%PDF-1.7                                    ~PH 1 0 obj
<</Pages20R/Type/Catalog>>
endobj
2 0 obj
<</Kids[30R]/Type/Pages/Count1>>
endobj
...
5 0 obj
...                                         ~PB
18 0 obj
...
7 0 obj
...

xref
0000000000 65535 f
0000000016 00000 n                          ~PR
...

trailer
<</Root 10R/Size 10>>
startxref                                   ~PT
Xxxxxx
%%EOF
```

FIG. 7A

```
%PDF-1.7
%Enable Page Split Mode
```
⎯PHi

FIG. 7B

| OBJECTS IN PAGE 1 |
| --- |
| OBJECTS IN PAGE 2 |
| ... |
| OBJECTS IN PAGE N |
| ... |
| Catalog OBJECT |
| Pages OBJECT |

←PB (pointing to OBJECTS IN PAGE N)

FIG. 7C

| /Contents OBJECT |
| --- |
| /ExtGState OBJECT |
| /ColorSpace OBJECT |
| /Pattern OBJECT |
| /Shading OBJECT |
| /Xobject OBJECT |
| /Font OBJECT |
| /Properties OBJECT |
| /Page OBJECT |

←PBn (pointing to /Pattern OBJECT)

FIG. 7D

```
3 0 obj
4 0 obj
5 0 obj
...
%End Page
1 0 obj
...
%End Page
2 0 obj
...
%End Page
```
⎯PB

FIG. 7E

```
%Start Page
3 0 obj
4 0 obj
5 0 obj
...
%Start Page
1 0 obj
...
%Start Page
2 0 obj
...
```
⎯PB

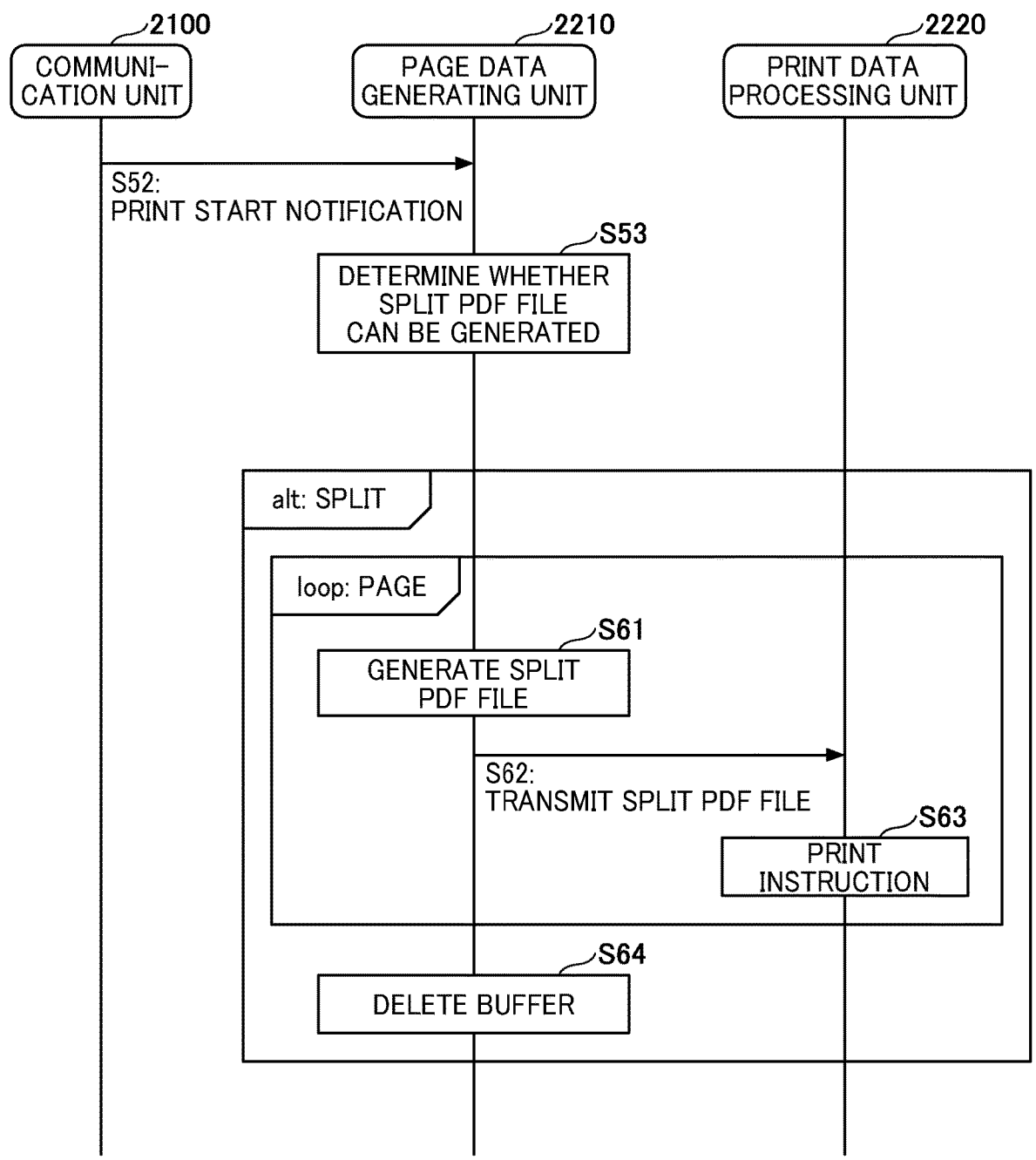

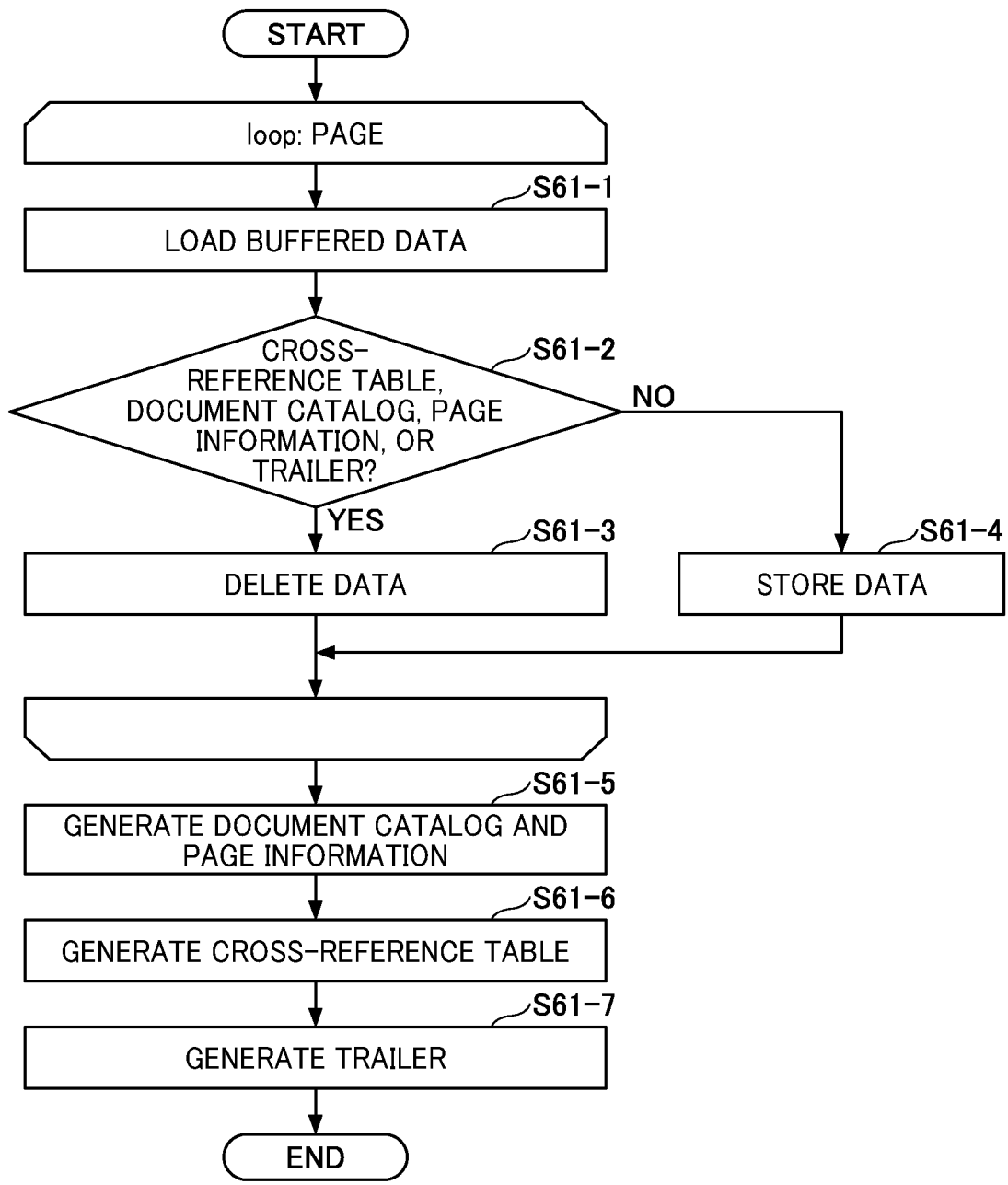

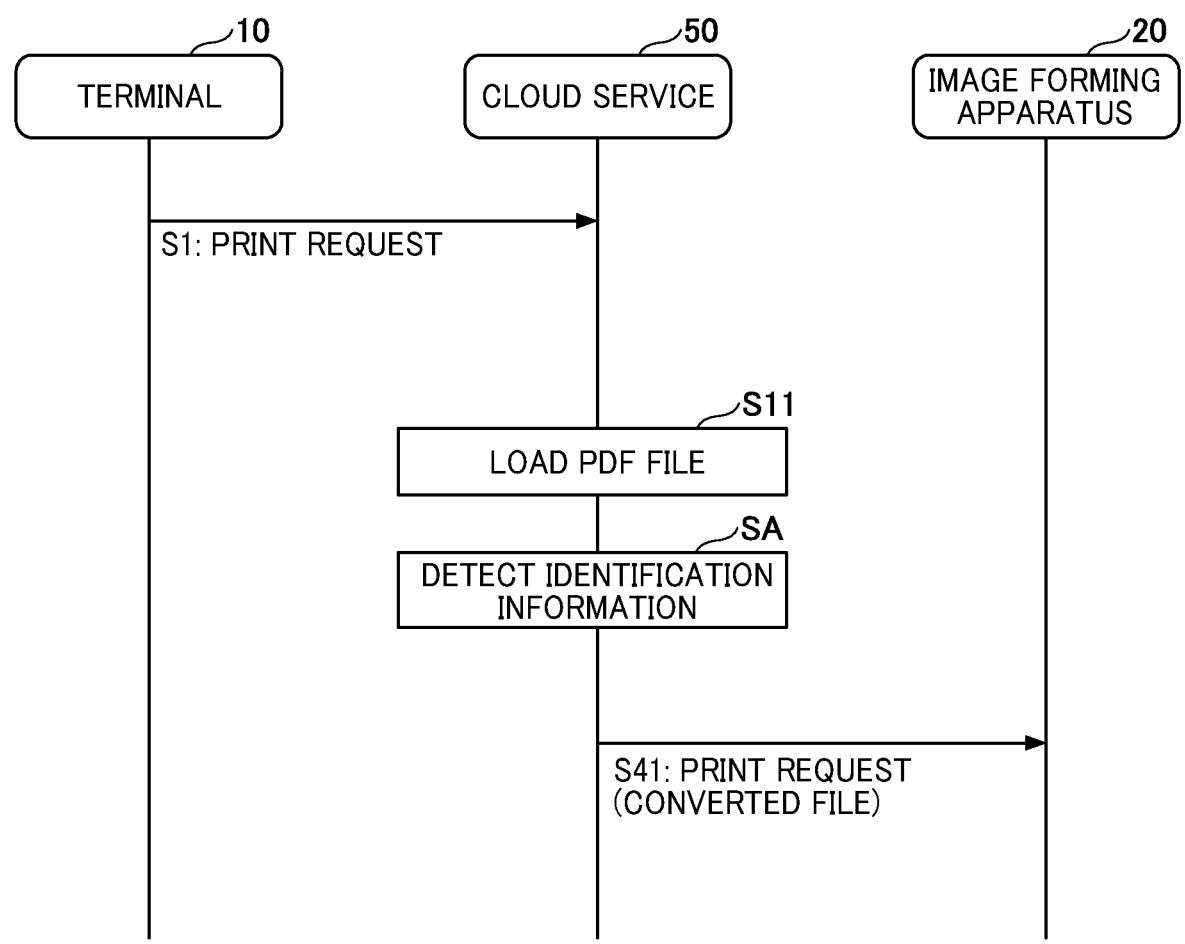

FIG. 15

|  | LOWER LIMIT VALUE | UPPER LIMIT VALUE |
|---|---|---|
| NUMBER OF PAGES | 0 | 2 |
| NUMBER OF OBJECTS | - | 10 |
| FILE SIZE (KB) | - | 1000 |
| NUMBER OF FONTS | - | 5000 |

FIG. 16

SPECIFY CONVERSION RANGE

|  | LOWER LIMIT VALUE | UPPER LIMIT VALUE |
|---|---|---|
| NUMBER OF PAGES | 0 | 2 |
| NUMBER OF OBJECTS |  | 10 |
| FILE SIZE (KB) |  | 1000 |
| NUMBER OF FONTS |  | 5000 |

501

OK    CANCEL

INFORMATION PROCESSING DEVICE, COMMUNICATION SYSTEM, AND RECORDING MEDIUM STORING INSTRUCTIONS

CROSS-REFERENCE TO RELATED APPLICATIONS

This patent application is based on and claims priority pursuant to 35 U.S.C. § 119(a) to Japanese Patent Application Nos. 2017-192104 and 2018-111382, filed on Sep. 29, 2017 and Jun. 11, 2018, respectively in the Japan Patent Office, the entire disclosure of which are hereby incorporated by reference herein.

BACKGROUND

Technical Field

The present disclosure relates to an information processing device, a communication system, and a recording medium storing a plurality of instructions.

Discussion of the Background Art

An image forming apparatus such as a multifunction peripheral (MFP) receives various files, such as printer control language (PCL), post script (PS), portable document format (PDF), and executes print processing. In a sequential access file such as PCL and PS, the data of each page is arranged in page order. Therefore, the image forming apparatus can sequentially read and print the data of each page while receiving the file of the sequential access format. On the other hand, with regard to data in a random access format such as a PDF file, the data of each page can be arranged irrespective of page order. The image forming apparatus accesses and prints the data of each page while referring to the structure information of the file arranged close to the end of the file, after the reception of the entire file is completed.

SUMMARY

Embodiments of the present disclosure described herein provide an information processing device, a communication system, and a recording medium storing a plurality of instructions. The information processing device and a method caused by the instructions includes generating a second document file from a first document file including data of a plurality of pages, where in the second document file data of each page in the plurality of pages is arranged in page order and identification information for identifying a boundary of data of each page is included, and transmitting the second document file to an image forming apparatus. A communication system includes the information processing device and the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings.

FIG. 5 is a conceptual diagram illustrating an example of a structure of a PDF file.

FIGS. 7A to 7E are conceptual diagrams each illustrating an example of structure of a PDF file.

FIG. 8 is a sequence diagram illustrating processes of a printing performed by an image forming apparatus, according to an embodiment of the present disclosure.

FIG. 9 is a flowchart illustrating processes of generating a split PDF file, according to an embodiment of the present disclosure.

FIG. 10 is a sequence diagram illustrating processes of printing performed in a communication system according to an embodiment of the present disclosure.

FIG. 15 is a diagram illustrating conversion conditions that can be designated by a user, according to an embodiment of the present disclosure.

FIG. 16 is a diagram illustrating an input screen where conversion conditions that can be designated by a user are input, according to an embodiment of the present disclosure.

Figure 1:
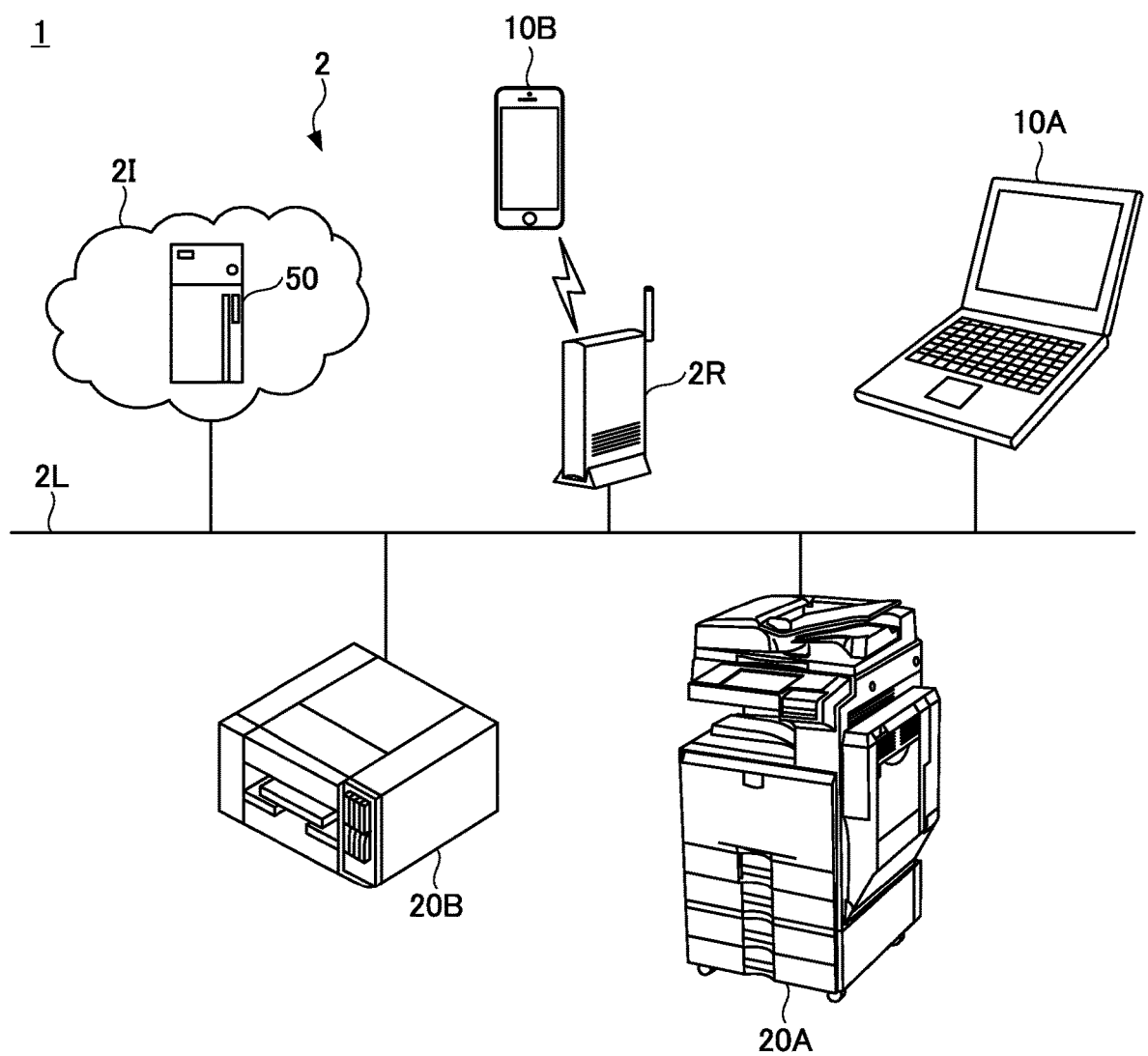
FIG. 1 is a schematic diagram illustrating an overall configuration of a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a schematic diagram illustrating an overall configuration of a communication system according to an embodiment of the present disclosure. Hereinafter, the communication terminal is referred to simply as a terminal. As illustrated in FIG. 1, the communication system 1 includes terminals 10A and 10B, image forming apparatuses 20A and 20B, and a cloud service 50. Any one of the terminals 10A and 10 B may be referred to as a terminal 10, and any one of the image forming apparatuses 20A and 20B may be referred to as an image forming apparatus 20. In the communication system 1, the number of individual terminals 10, image forming apparatuses 20, and cloud services 50 is not particularly limited.

The terminal 10 is an information processing device having a communication function and is, for example, a smart device such as a tablet, a smartphone, a notebook personal computer (PC), a videoconference terminal, an electronic whiteboard, or a camera. In FIG. 1, the terminal 10A is, for example, a notebook (laptop) PC, and the terminal 10B is, for example, a smart device.

The image forming apparatus 20 is an information processing apparatus having an image processing function and a communication function, and is, for example, an MFP, a facsimile, a scanner, or a printer. In FIG. 1, the image forming apparatus 20A is, for example, an MFP having a facsimile, a scanner, and a printer function, and the image forming apparatus 20B is, for example, a printer.

The cloud service 50 is an information processing device having a communication function. The cloud service 50 functions as a print server that manages a document file such as a PDF file based on a request from the terminal 10 or the image forming apparatus 20 and transmits the document file to the image forming apparatus 20. The cloud service 50 also has a function of converting a document file, as will be described later.

The terminal 10 and the image forming apparatus 20 are connected to a local area network (LAN) 2L directly or via a wireless LAN router 2R. The terminal 10 and the image forming apparatus 20 connect to the internet 2I from the LAN 2L and connect to the cloud service 50 on the internet 2I. Any one of the LAN 2L and the internet 2I may be referred to as a communication network 2. Wireless communication such as wireless fidelity (Wi-Fi) or the like may be enabled in the whole or a part of the communication network 2.

The terminal 10 and the cloud service 50 generate a document file in a random access format such as a PDF file using an arbitrary application or driver. The terminal 10 and the cloud service 50 transmit a print request including the document file to the image forming apparatus 20. The image forming apparatus 20 receives the document file transmitted by the terminal 10 or the cloud service 50 and executes a printing process.

Figure 2:
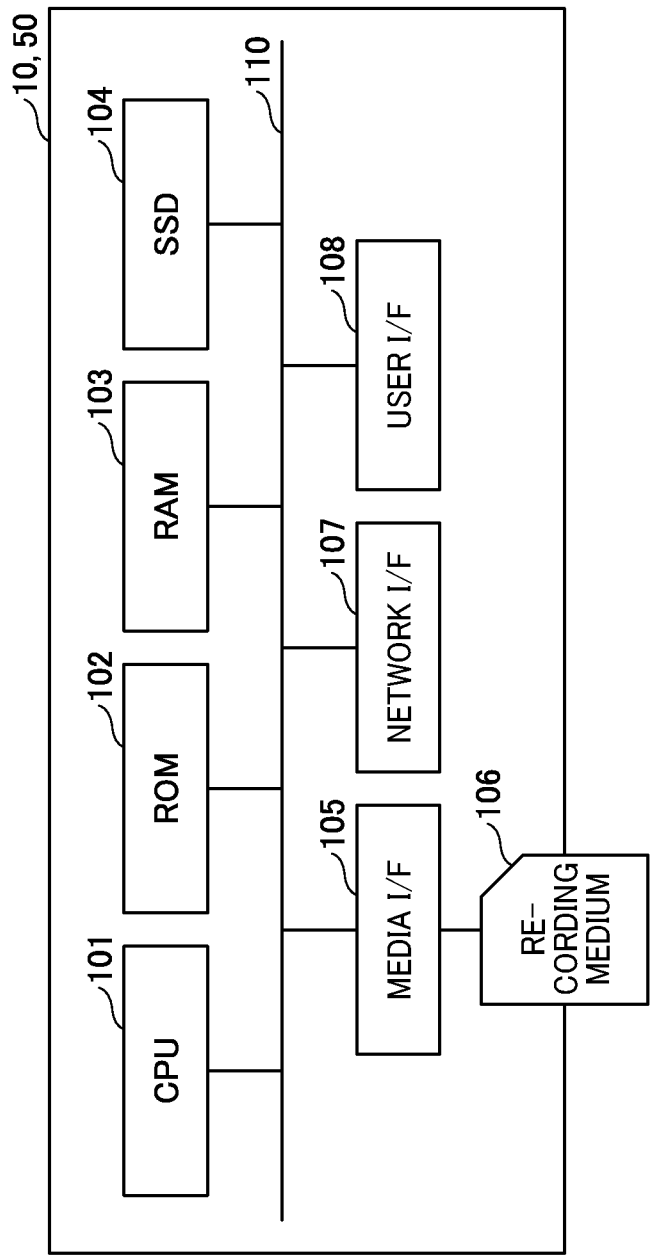
FIG. 2 is a block diagram illustrating a hardware configuration of a terminal according to an embodiment of the present disclosure.

FIG. 2 is a block diagram illustrating a hardware configuration of a terminal according to an embodiment of the present disclosure. Referring to FIG. 2, a hardware configuration of the communication terminal 10 is described.

The terminal 10 includes a central processing unit (CPU) 101, a read only memory (ROM) 102, a random access memory (RAM) 103, a solid state drive (SSD) 104, a media interface (I/F) 105, a network interface (I/F) 107, a user interface (I/F) 108, and a bus line 110.

The CPU 101 controls the operation of the entire terminal 10. The ROM 102 stores various programs and applications operating on the terminal 10. The RAM 103 is used as a work area for the CPU 101. The SSD 104 stores data used in various programs or applications. The media I/F 105 is an interface for reading out information stored in a recording medium 106 such as an external memory or writing information to the recording medium 106. The network I/F 107 is an interface for communicating with other devices via the communication network 2. The user I/F 108 is an interface for accepting an operation input by the user. The user I/F 108 is, for example, a liquid crystal display device or an organic electro luminescence (EL) display device equipped with a touch panel function, or a keyboard and a mouse. The bus line 110 is an address bus or a data bus for electrically connecting the respective constituent elements as illustrated in FIG. 2.

Since the cloud server 50 is substantially similar to the terminal 10 in hardware configuration, a description of the hardware configuration is omitted. Note that the SSD 104 can be replaced with any nonvolatile storage device such as a hard disk drive (HDD).

Figure 3:
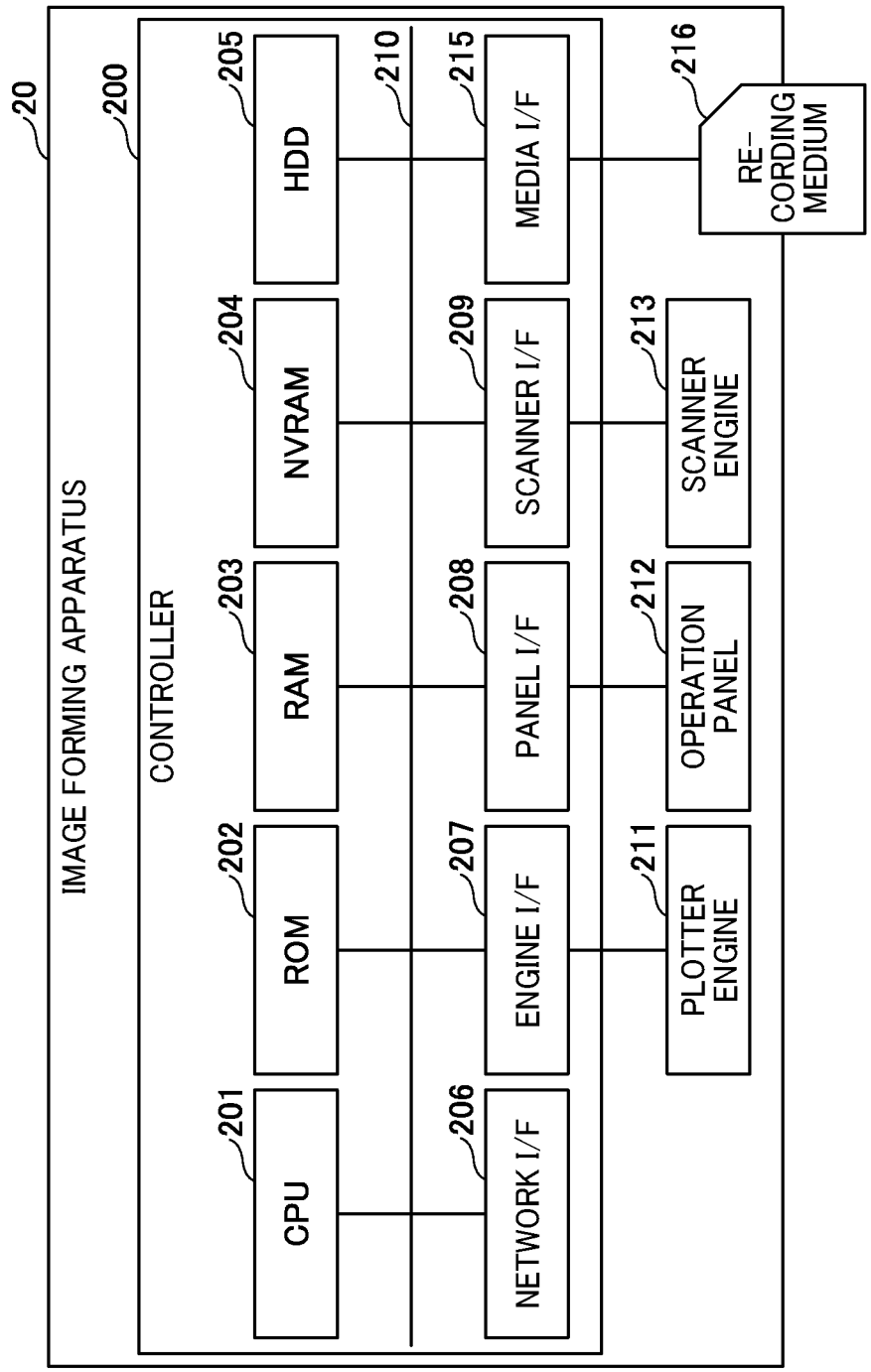
FIG. 3 is a block diagram illustrating a hardware configuration of an image forming apparatus according to an embodiment of the present disclosure.

FIG. 3 is a block diagram illustrating a hardware configuration of the image forming apparatus 20. Referring to FIG. 3, a hardware configuration of the image forming apparatus 20 is described.

The controller 200 of the image forming apparatus 20 includes a CPU 201, a ROM 202, a RAM 203, a non-volatile RAM (NVRAM) 204, an HDD 205, a network I/F 206, an engine interface (I/F) 207, a panel interface (I/F) 208, a scanner interface (I/F) 209, a media I/F 215, and a bus line 210. Further, the image forming apparatus 20 includes a plotter engine 211, an operation panel 212, and a scanner engine 213.

The CPU 201 controls the overall operation of the image forming apparatus 20. The ROM 202 stores various programs and applications operating on the image forming apparatus 20. The RAM 203 is used as a work area for the CPU 201. The NVRAM 204 and the HDD 205 store data used in various programs or applications. The network I/F 206 is an interface for communicating with other devices via the communication network 2. The engine I/F 207 is an interface for connecting to the plotter engine 211. The panel I/F 208 is an interface for connecting to the operation panel 212. The scanner I/F 209 is an interface for connecting to the scanner engine 213. The media I/F 215 is an interface for reading out information stored in a recording medium 216 such as an external memory or writing information to the recording medium 216. The bus line 210 is an address bus or a data bus for electrically connecting the respective constituent elements as illustrated in FIG. 3.

The plotter engine 211 controls the operation of the plotter of the image forming apparatus 20 in the process of printing the image on the recording medium. The plotter is an arbitrary printing apparatus. In the case of an ink jet method, for example, the plotter is an ink jet head, and in the case of a laser printer method, for example, the plotter is a photoconductor, a laser irradiation apparatus, or a transfer apparatus. The operation panel 212 is a panel for accepting input of settings, conditions, instructions, and the like from the user, and is, for example, a liquid crystal display device or an organic EL display device with a touch panel function, or a keyboard and a mouse. The scanner engine 213 controls the operation of the scanner in the image forming apparatus 20. There are no particular limitations as to the type of scanner, but examples thereof include known versions having a pressure plate, an automatic document feeder (ADF), and an image sensor.

Next, a description is given of a functional configuration of the image forming apparatus 20, according to the present embodiment.

Figure 4:
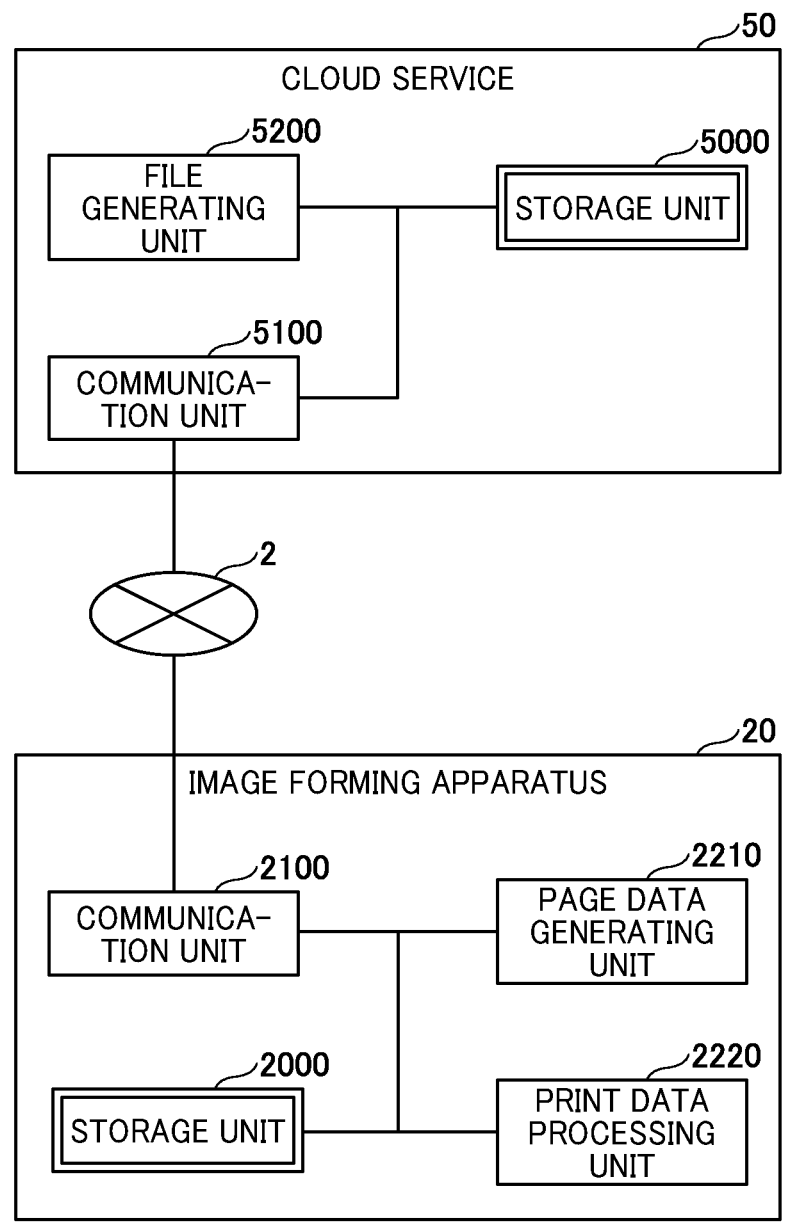
FIG. 4 is a block diagram illustrating a functional configuration of an image forming apparatus and a cloud service, according to an embodiment of the present disclosure.

FIG. 4 is a block diagram illustrating a functional configuration of an image forming apparatus 20 and a cloud service 50, according to the present embodiment.

The image forming apparatus 20 includes a communication unit 2100, a page data generating unit 2210, and a print data processing unit 2220. The functions of these units are implemented by operation of any of the constituent elements illustrated in FIG. 3 according to the instruction given by the CPU 201 based on programs and applications of the image forming apparatus 20 stored in the ROM 202 and executed in the RAM 203. Further, the image forming apparatus 20 has a storage unit 2000 implemented by the ROM 202, the RAM 203, the NVRAM 204, or the HDD 205.

The communication unit 2100 controls communication with other devices via the communication network 2 by a command from the CPU 201 and processing of the network I/F 206.

Based on a command from the CPU 201, the page data generating unit 2210 generates a PDF file for each page of a PDF file having a plurality of pages.

The print data processing unit 2220 performs control for printing an image by the operation of the plotter engine 211 based on a command from the CPU 201.

The cloud service 50 includes a communication unit 5100 and a file generating unit 5200. The functions of the communication unit 5100 and the file generating unit 5200 are implemented by the operation of any of the constituent elements illustrated in FIG. 2 based on a command from the CPU 101 according to the program or the application of the cloud service 50 stored in the ROM 102 and executed on the RAM 103. Further, the cloud service 50 includes a storage unit 5000 implemented by the ROM 102, the RAM 103, or the SSD 104.

The communication unit 5100 controls communication with other devices via the communication network 2 by a command from the CPU 101 and processing of the network I/F 107.

The file generating unit 5200 generates a PDF file that can be split into PDF files for each page based on a command from the CPU 101.

FIG. 5 is a conceptual diagram illustrating an example of the structure of the PDF file. In compliance with an open standard managed by the International Organization for Standardization (ISO), the PDF file has a header PH, a body PB, a cross-reference table PR, and a trailer PT in order from the top. In FIG. 5, information included in the header PH, the body PB, the cross-reference table PR, and the trailer PT is an example.

The header PH includes PDF version information and the like.

In the body PB, an object number is assigned to each object such as a document catalog, page information, object information of each page, and the like. The object number is an identifier of an object. For example, a reference number (x), a generation number (y), and "obj" are arranged like "1 0 obj". The document catalog is the root (top) of the object hierarchy. The page information includes a reference to object information of each page, and the like. The object information of each page includes data for drawing each page.

The cross-reference table PR includes address information (position information) of each object having an object number defined in the body PB. The address information is offset information indicating the number of bytes from the head of the header PH to the object. The image forming apparatus 20 identifies the position of the object based on the cross-reference table PR and accesses the object.

The trailer PT includes address information (startxref) indicating the position of the cross-reference table PR, object number (Root) of the document catalog, reference to the creation date and time of the PDF file (Info), and the like.

Due to the structure of the PDF file, the image forming apparatus 20 accesses the document catalog by specifying the object number of the document catalog from the trailer PT and specifying the address information corresponding to this object number from the cross-reference table PR. In the normal operation by the image forming apparatus 20, the image processing related to the PDF file is started after reading up to the trailer PT of the PDF file.

In the PDF specification, the object information does not have to be arranged in page order and it is not necessary that the object number is a sequential number. For example, in FIG. 5, "5 0 obj, 18 0 obj, 7 0 obj" may be object information for drawing the fifth page, the first page, or the third page in the document. Therefore, if the object information is not arranged, the image forming apparatus 20 cannot determine which part of the object information is in which page without the cross-reference table PR.

The processes performed in the communication system 1 are described below.

Figure 6:
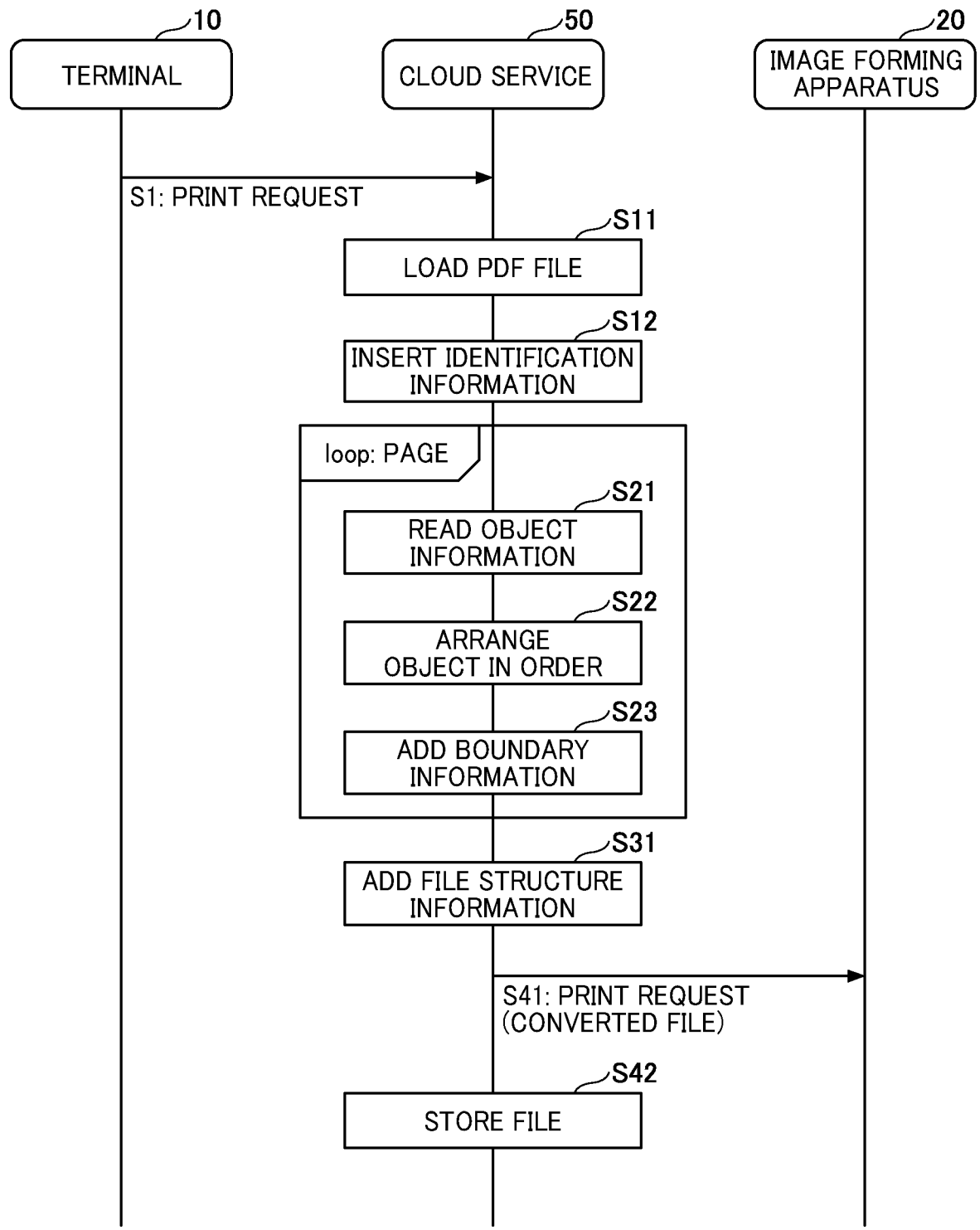
FIG. 6 is a sequence diagram illustrating processes of printing an image, according to an embodiment of the present disclosure.

FIG. 6 is a sequence diagram illustrating processes of printing an image, according to the present embodiment. Hereinafter, an exemplary process of transmitting a document file managed by the cloud service 50 to the image forming apparatus 20 and printing the document file in the image forming apparatus 20 based on a request from the terminal 10 is described. However, when the terminal 10 has the same function as that of the cloud service 50, it is also possible to transmit a print request directly to the image forming apparatus 20 from the terminal 10. In this case, the process of the cloud service 50 in FIG. 6 is replaced with the process of the terminal 10. Further, based on a print request from the image forming apparatus 20, the cloud service 50 may transmit the document file to the image forming apparatus 20, and the image forming apparatus 20 may execute the printing process. In this case, the process of the terminal 10 in FIG. 6 is replaced with the process of the image forming apparatus 20.

In response to input of a print request by the user, the terminal 10 transmits a print request to the cloud service 50 via the communication network 2 (step S1). The print request includes the name of the file to be printed. Hereinafter, a case where the file to be printed is a PDF file is described.

The communication unit 5100 of the cloud service 50 receives the print request transmitted by the terminal 10. The file generating unit 5200 of the cloud service 50 loads the PDF file indicated in the print request from the storage unit 5000 (step S11).

The file generating unit 5200 of the cloud service 50 inserts identification information in the header of the loaded PDF file to specify that the file can be split into a plurality of PDF files (step S12).

FIG. 7A to FIG. 7E are conceptual diagrams illustrating example structure of a PDF file.

FIG. 7A illustrates a header PHi into which the identification information has been entered.

Subsequently, the file generating unit 5200 of the cloud service 50 repeats the following loop processing for the data of each page included in the PDF file loaded in step S11.

First, the file generating unit 5200 of the cloud service 50 searches the PDF file loaded in step S11 and reads object information for drawing the first page of the document (step S21). At this time, even when the searched object information is compressed, the file generating unit 5200 reads the object information in a compressed state without decompressing the object information.

The file generating unit 5200 of the cloud service 50 moves the object for drawing the first page read in step S21 to the head side of the body PB in the PDF file so that the description of the body PB is arranged in the page order (step S22).

The file generating unit 5200 of the cloud service 50 adds boundary information (also referred to as page separation information indicating a delimiter position) indicating the boundaries of the object of the first page in the body PB of the PDF file (step S23). Two examples of methods of adding the boundary information are described below.

In the first method of adding the boundary information, predetermined object information is used as the boundary information.

FIG. 7B is a conceptual diagram illustrating the body PB of the PDF file.

FIG. 7C is a conceptual diagram illustrating an object group of the nth page of the PDF file.

In the example of FIG. 7B and FIG. 7C, "/Page object" is used as the boundary information. That is, the file generating unit 5200 of the cloud service 50 extracts "/Page object" for page n from the "Pages object" in the body PB of FIG. 7B, and by inserting it at the rear end of the group PBn (FIG. 7C), sets "/Page object" as the boundary information. Note that the file generating unit 5200 may insert "/Page object" as the boundary information by inserting "/Page object" for page n at the top of the object group PBn of the nth page. Note also that "/Page object" is defined in the PDF specification. The file generating unit 5200 may also insert other object information such as "/Contents object" other than "/Page object" at the top or at the end of the object group, thereby forming the boundary information.

In the second method of adding the boundary information, a comment indicating a page break is used as the boundary information. The comment indicating the page break does not directly affect the drawing content of the page according to the PDF specification. FIG. 7D and FIG. 7E are conceptual diagrams of a body of a PDF file to which the comment indicating the page break is added.

In the example of FIG. 7D, a comment "% End Page" indicating the page break is added to the end of the object group of each page. In the example of FIG. 7E, a comment "% Start Page" indicating the page break is added to the top of the object group of each page. The image forming apparatus 20 can detect these comments and determine the page break position while reading the PDF file.

Upon completion of the processing in step S23, the file generating unit 5200 of the cloud service 50 checks whether unprocessed data remains in the PDF file loaded in step S11. When any unprocessed data is found, the file generating unit 5200 repeats loop processing on the unprocessed data. At this time, the file generating unit 5200 of the cloud service 50 inserts the object group of the nth page loaded in step S21 after the object group of the n−1th page of the body PB in the PDF file, to arrange the objects in the body PB in the page order (step S22).

After the loop processing is completed, the file generating unit 5200 of the cloud service 50 adds the file structure information to the PDF file to which the boundary information is added and updates the PDF file (step S31). The file structure information includes a page tree, a document catalog, a cross-reference table PR, a trailer, and the like as prescribed in the PDF specification. The file to which the file structure information is added complies with the PDF specification.

The file generating unit 5200 of the cloud service 50 generates and adds page information Bp necessary for the print job. A predetermined value is assigned to the object number of the page information. The page information includes a page number and a reference to an object for drawing a page.

The file generating unit 5200 of the cloud service 50 generates a document catalog as job information necessary for the print job and adds the document catalog to the PDF file in the generating process. A predetermined value is assigned to the object number of the document catalog. The job information necessary for the print job includes a reference to the object of the page information. As described above, since the object number of the page information is predetermined, the reference to the page information is a predetermined value.

The file generating unit 5200 of the cloud service 50 generates the cross-reference table PR and adds the cross-reference table PR after the body PB in the PDF file in the generating process to which the boundary information is added. The cross-reference table PR is address information indicating offset information which represents the position of each object in the body PB. The page data generating unit 2210 searches each object from the previously generated body PB and describes the address information indicating the position of each retrieved object as offset information, thereby generating the cross-reference table PR.

The communication unit 5100 of the cloud service 50 transmits a print request including a PDF file to which the structure information of the file is added to the image forming apparatus 20 (step S41). A file in the PDF format to which the file structure information is added is expressed as a converted file.

The file generating unit 5200 of the cloud service 50 stores the converted file in the storage unit 5000 (step S42). Since the converted file complies with the PDF specification, it is possible to read the converted file stored in the storage unit 5000 by a viewer and browse the entire document.

The processing of the image forming apparatus 20 that received the print request is described below.

FIG. 8 is a sequence diagram illustrating processes of printing performed by the image forming apparatus 20, according to the present embodiment.

When the communication unit 2100 of the image forming apparatus 20 starts receiving the print request transmitted by the terminal 10, the communication unit 2100 of the image forming apparatus 20 sequentially stores the PDF file included in the print request as a buffer in the RAM 203 (a process known as buffering). The image forming apparatus 20 continues the following printing process without waiting for completion of the buffering.

The communication unit 2100 transmits a print start notification to the page data generating unit 2210 to start printing (step S52).

Upon receiving the print start notification, the page data generating unit 2210 determines whether it is possible to generate a PDF file split into each page from the PDF file included in the print request (step S53). Hereinafter, a PDF file split into each page is expressed as a split PDF file. For example, when the number of pages of the PDF file included in the print request is 10 and all pages are to be printed, the page data generating unit 2210 determines whether the split PDF file for each of the 10 pages can be generated.

When the page data generating unit 2210 detects the identification information in the header PHi portion of the received buffer, the page data generating unit 2210 determines that the split PDF file can be generated.

Hereinafter, a case where determination is made in step S53 that the split PDF files can be generated is described. Each time the object included in each page of the PDF file is received, the page data generating unit 2210 of the image forming apparatus 20 generates the split PDF file for each page (step S61).

FIG. 9 is a flowchart illustrating processes of generating a split PDF file, according to the present embodiment. The process of step S61 is described in detail with reference to FIG. 9. The process of step S61 is executed without waiting for completion of the reception of the PDF file sent from the cloud service 50.

A portion of the PDF file received by the communication unit 2100 is sequentially stored in the RAM 203 as a buffer. The page data generating unit 2210 loads each record of the buffer one by one (step S61-1).

The page data generating unit 2210 determines whether the loaded record corresponds to the cross-reference table PR, the document catalog, the page information, or the trailer PT (step S61-2).

When a determination is made that the loaded record corresponds to any of the cross-reference table PR, the document catalog, the page information, or the trailer PT (YES in step S61-2), the page data generating unit 2210 deletes the loaded record (step S61-3). This is because each record of the cross-reference table PR, the document catalog, the page information, and the trailer PT is newly generated at the time of generating the split PDF file by the process described later.

When a determination is made that the loaded record does not correspond to any of the cross-reference table PR, the document catalog, the page information, or the trailer PT (NO in step S61-2), the page data generating unit 2210 stores the loaded record in the storage unit 2000 (step S61-4).

The page data generating unit 2210 repeats the processing of steps S61-1 to S61-4 until processing for all records (objects) in one page is complete. The page data generating unit 2210 can determine whether or not the loading of the record of one page has been completed by reading the boundary information in the body PB.

Upon completion of the above loop processing, the objects including all data for drawing one page, which are all records excluding the cross-reference table PR, the document catalog, the page information, or the trailer PT from the records of one page extracted from the PDF file, are stored in the storage unit 2000. The page data generating unit 2210 sets the records stored in the storage unit 2000 as the body of the split PDF file.

The body does not include the cross-reference table PR, the document catalog, the page information, the trailer PT, and the like deleted in the process of step S61-3. Even if this body is transmitted as a split PDF file to the print data processing unit 2220, the print data processing unit 2220 cannot execute print processing because this split PDF file does not comply with the PDF specification. Therefore, the page data generating unit 2210 adds necessary information to the body to complete a PDF file that complies with the PDF specification.

In this processing, the page data generating unit 2210 generates and adds a header to the head of the split PDF file in the generating process. The header to be added includes a fixed form such as PDF version information.

The page data generating unit 2210 adds the generated document catalog and page information to the rear end of the body (step S61-5). Subsequently, the page data generating unit 2210 generates and adds the cross-reference table after the body in the split PDF file in the generating process (step S61-6). The page data generating unit 2210 generates and adds the trailer after the cross-reference table PR in the split PDF file in the generating process, thereby completing the split PDF file which complies with the PDF specification (step S61-7). The processing in steps S61-5 to S61-7 is the same as the processing for adding the file structure information in step S31.

The description of processing after completion of the split PDF file for one page continues with reference to FIG. 8. The page data generating unit 2210 transmits the generated split PDF file to the print data processing unit 2220 (step S62).

The print data processing unit 2220 analyzes the received split PDF file and generates a print image by drawing an image of one page in the frame memory while accessing the data. The print data processing unit 2220 transmits the print instruction including the print image to the plotter engine 211 to execute the printing process (step S63). Upon receipt of an instruction of printing process, the plotter engine transfers the printed image of one page to the paper and outputs the print.

The page data generating unit 2210 determines whether data of an unprocessed page whose generation of split PDF files has not been completed is remaining in the buffer among the data of the page to be printed. When it is determined that data of an unprocessed page is remaining, the image forming apparatus 20 repeats the processing of steps S61 to S63. In this manner, the split PDF files corresponding to the image content of each page to be printed are generated, and the printing process is executed one page at a time.

After completing the printing processes of all pages to be printed, the page data generating unit 2210 deletes remaining data in the buffer (step S64). Accordingly, the capacity of one page is sufficient for the buffer since the communication unit 2100 stands by for reception of next data after the buffer is cleared.

Modification A of Example Embodiment

A modification A of the example embodiment is described below, with an emphasis on that which is different from the example embodiment described above. In the modification A of example embodiment, a process wherein a print request for a converted PDF file is received in the cloud service 50 is described.

FIG. 10 is a sequence diagram illustrating processes of printing performed in the communication system 1 according to the present embodiment.

When the print request is received in the cloud service 50 (step S1), the file generating unit 5200 loads the PDF file indicated in the print request from the storage unit 5000 (step S11).

The file generating unit 5200 of the cloud service 50 detects for the identification information "% Enable Page Split Mode" included in the header of the loaded file (step SA).

When the identification information is detected in step SA, the cloud service 50 does not execute the file conversion process of steps S12 to S31. This is because the loaded file is already converted so that it can be split into multiple PDF files.

The communication unit 5100 of the cloud service 50 transmits a print request including the PDF file loaded in step S11 to the image forming apparatus 20 (step S41). Upon receiving the print request, the image forming apparatus 20 executes printing process in the same manner as in the above embodiment.

Modification B of Example Embodiment

A modification B of the example embodiment is described, with an emphasis on that which is different from the example embodiment described above.

Figure 11:
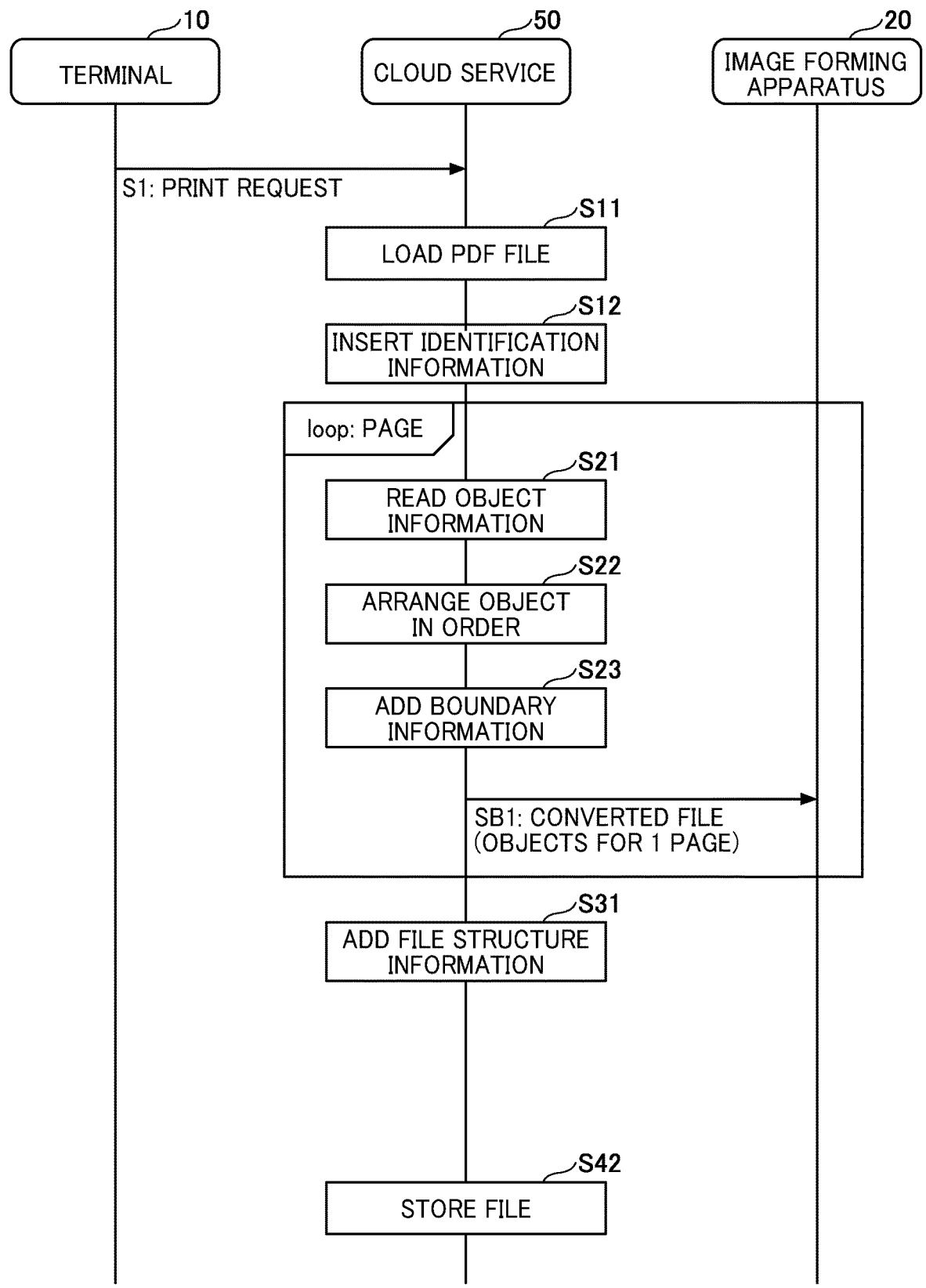
FIG. 11 is a sequence diagram illustrating processes of converting an image, according to an embodiment of the present disclosure.

FIG. 11 is a sequence diagram illustrating processes of converting a file, according to the present embodiment.

Every time the file generating unit 5200 of the cloud service 50 arranges the objects for one page in the converted file (step S22) and adds the boundary information (step S23), the communication unit 5100 transmits the object for one page to the image forming apparatus 20 (step SB1).

When file structure information is generated by the file generating unit 5200 of the cloud service 50 (step S31), the communication unit 5100 transmits the file structure information to the image forming apparatus 20. By transmitting the file structure information to the image forming apparatus 20, the entire converted file is ultimately transmitted to the image forming apparatus 20. As a result, even when a print request that does not execute the process of splitting and printing the converted file in the page order, such as printing in the reverse order, is received, the image forming apparatus 20 can process printing according to the conditions of the print request based on the file structure information. The cloud service 50 does not have to transmit the file structure information to the image forming apparatus 20, when the cloud service 50 confirmed that the image forming apparatus 20 can split and print the converted file in the page order, for example, through communication via the communication network 2. Even in this case, however, the cloud service 50 transmits a converted file including a predetermined comment "%% EOF" at the end to the image forming apparatus 20 so as to indicate the end of the converted file to the image forming apparatus 20.

The processing in the image forming apparatus 20 is the same as in the above embodiment. However, the image forming apparatus 20 can start the printing process before the loop processing in the cloud service 50 is completed.

As described above, the communication unit 5100 of the cloud service 50 sequentially transmits the generated data to the image forming apparatus 20 every time data for constructing the converted file is generated in the process of generating the converted file. The timing of transmission is not limited to the timing at which an object for one page is generated. For example, the communication unit 5100 may transmit data of a predetermined size generated to the image forming apparatus 20 each time data of a predetermined size is generated by the file generating unit 5200.

According to the image forming method of the above embodiment and modifications, the file generating unit 5200 (an example of a generating unit) of the cloud service 50 (an example of the information processing device) generates a converted file (an example of a second document file), from a PDF file (an example of the first document file) including data of a plurality of pages, where data of each page in a plurality of pages are arranged in page order, and the boundary information (an example of the identification information) for identifying the boundary of the data of each page, is included in this arrangement (an example of generation processing). The communication unit 5100 (an example of a transmission unit) of the cloud service 50 transmits the converted file generated by the file generating unit 5200 to the image forming apparatus 20 (an example of transmission processing). Since the converted file contains data for drawing all the pages in the document, the entire document can be browsed by opening the converted file in the viewer. In the converted file, since data of each page is arranged in page order, the image forming apparatus 20 as the transmission destination of the converted file can execute the printing process while overlapping with the transmission processing.

The file generating unit 5200 of the cloud service 50 rearranges the "/Page object" (an example of predetermined elements) at the end of the data of each page as the boundary information, thereby generating a converted file. Thus, the image forming apparatus 20 can specify the position of the object for drawing each page based on the position of the "/Page object". Further, since the image forming apparatus 20 can generate and print a split PDF file for each page based on the converted file, the capacity of the memory required for the image forming apparatus 20 can be reduced.

The file generating unit 5200 of the cloud service 50 generates a converted file by placing a predetermined comment "% End Page" (an example of identification information) as a boundary information at the end of the data of each page. Thus, the image forming apparatus 20 can specify the position of the object for drawing each page based on the position of the predetermined comment. Further, since the image forming apparatus 20 can generate and print a split PDF file for each page based on the converted file, the capacity of the memory required for the image forming apparatus 20 can be reduced.

The file generating unit 5200 of the cloud service 50 generates a converted file including a comment "% Enable Page Split Mode" (an example of arrangement information) indicating that data of each page is arranged in page order. As a result, the image forming apparatus 20 that has received the converted file can determine whether a split PDF file can be generated from the converted file based on the comment.

When the comment "% Enable Page Split Mode" is included in the PDF file, the file generating unit 5200 of the cloud service 50 does not generate a new converted file, and the communication unit 5100 transmits the PDF file to the image forming apparatus 20. As a result, PDF files already converted in page order are transmitted to the image forming apparatus 20 without converting the file again, resulting in shortened printing time.

The communication unit 5100 of the cloud service 50 sequentially transmits the generated data to the image forming apparatus 20 every time data for constructing the converted file is generated by the file generating unit 5200. Alternatively, the communication unit 5100 of the cloud service 50 transmits the generated data of one page to the image forming apparatus every time data of one page in a plurality of pages is generated by the file generating unit 5200. Alternatively, the communication unit 5100 of the cloud service 50 transmits data of the predetermined size generated to the image forming apparatus 20 every time data of a predetermined size is generated by the file generating unit 5200. As a result, the cloud service 50 can transmit the data of each page to the image forming apparatus 20 before the generation of the converted file is completed, resulting in shortened printing time.

A page data generating unit (an example of a dividing unit) of the image forming apparatus 20 generates a split PDF file (an example of a third document file) obtained by splitting data for each page from the converted file. The print data processing unit 2220 (an example of a printing unit) of the image forming apparatus 20 prints the split PDF file.

Thereby, the image forming apparatus 20 can execute the printing process of the split PDF file without waiting for the transmission of the entire converted file.

Second Embodiment

In the first embodiment, the cloud service 50 arranges the data of each page in page order, adds the boundary information for identifying the boundary of the data of each page, and generates a converted file from the PDF file including the data of a plurality of pages.

However, even though the time until the image forming apparatus 20 prints the first page can be shortened by the technique of converting the PDF file of the first embodiment, the time required for file conversion is not zero, and there is a problem that, depending on the PDF file to be converted, printing the converted file may not be faster.

Therefore, in the present embodiment, the communication system 1 shortens the printing time of a PDF file by printing without converting the PDF file, when it is more efficient to print without converting the PDF file, as described below.

Note that the overall configuration diagram of FIG. 1, the hardware configuration diagram of the terminal of FIG. 2, and the hardware configuration diagram of the image forming apparatus 20 of FIG. 3 used in the first embodiment are also referred to in this embodiment.

Figure 12:
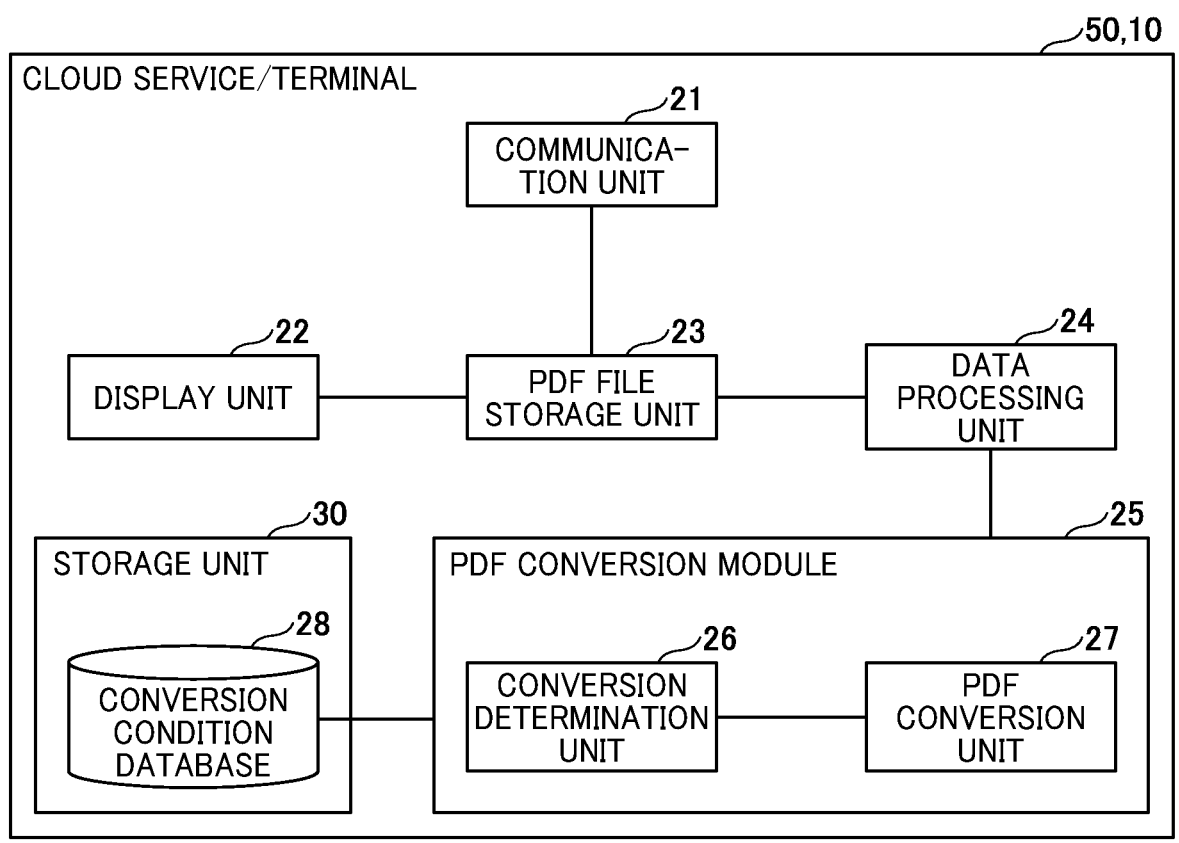
FIG. 12 is a block diagram illustrating functions of a cloud service or a terminal, according to an embodiment of the present disclosure.

FIG. 12 is a block diagram illustrating functions of the cloud service 50 or the terminal 10, according to the present embodiment. Note that the terminal 10 may have the same function as that of the cloud service 50. In the following, the function described for the cloud service 50 may be possessed by the terminal 10.

The cloud service 50 according to the present embodiment includes a communication unit 21, a display unit 22, a PDF file storage unit 23, a data processing unit 24, a conversion determination unit 26, and a PDF conversion unit 27. The functions of these units of the cloud service 50 are implemented by the operation of any of the constituent elements illustrated in FIG. 2 based on a command from the CPU 101 according to the program or the application of the cloud service 50 stored in the ROM 102 and executed on the RAM 103. Further, the cloud service 50 includes a storage unit 30 implemented by the ROM 102, the RAM 103, or the SSD 104.

First, the conversion condition database 28 built in the storage unit 30 is described. Table 1 schematically illustrates the conversion conditions stored in the conversion condition database 28.

TABLE 1

Conversion Conditions

Number of pages in the PDF file is equal to or less than a specified value or equal to or more than a specified value
Number of objects in the PDF file is equal to or less than a specified value or equal to or more than a specified value
File size of the PDF file is equal to or less than a specified value or equal to or more than a specified value
Number of fonts embedded in the PDF file is equal to or less than a specified value or equal to or more than a specified value.
PDF file is already converted
PDF portfolio (PDF file with/Collection set in/Catalog)
PDF file with/OCProperties in/Catalog set to/OFF
PDF file with/AcroForm set in/Catalog When any of the conditions in the conversion condition database 28 matches, the PDF file is not converted. Conversely, conversion conditions for converting the PDF file may be stored in the conversion condition database 28.

Next, the functions of the cloud service 50 are described. When the functions illustrated in FIG. 12 are implemented in the cloud service 50, the communication unit 21 receives the PDF file from the terminal 10 and transmits the converted or unconverted PDF file to the image forming apparatus 20. When the functions illustrated in FIG. 12 are implemented in the terminal 10, the communication unit 21 transmits the converted or unconverted PDF file to the image forming apparatus 20.

The display unit 22 is mainly a function of the terminal 10. For example, the display unit 22 receives an instruction from the user through a touch panel and displays a message to inform the user.

When the functions illustrated in FIG. 12 are implemented in the cloud service 50, the PDF file to be printed is acquired by the communication unit 21 and temporarily stored in the PDF file storage unit 23. When the function illustrated in FIG. 12 is implemented in the terminal 10, the PDF file to be printed is stored in the PDF file storage unit 23.

The data processing unit 24 has the same function in the cloud service 50 and in the terminal 10. The data processing unit 24 requests the PDF conversion module 25 to determine whether or not the conversion of the PDF file is necessary and when a determination is made that the conversion is necessary, acquires the converted PDF file from the PDF conversion module 25. The PDF conversion module 25 acquires the PDF file that is not converted when a determination is made that the conversion is not necessary. Further, the data processing unit 24 instructs the image forming apparatus 20 to print the converted or unconverted PDF file.

The PDF conversion module 25 has the same functions in the cloud service 50 and in the terminal 10. The PDF conversion module 25 includes a conversion determination unit 26 and a PDF conversion unit 27. The conversion determination unit 26 determines whether or not to convert the PDF file sent from the data processing unit 24 based on the conversion conditions stored in the conversion condition database 28. When the conversion determination unit 26 determines to convert the PDF file, the PDF conversion unit 27 converts the PDF file into a format that can be processed sequentially. The conversion method is explained in the first embodiment. The PDF conversion unit 27 corresponds to the file generating unit 5200 of the first embodiment.

Figure 13:
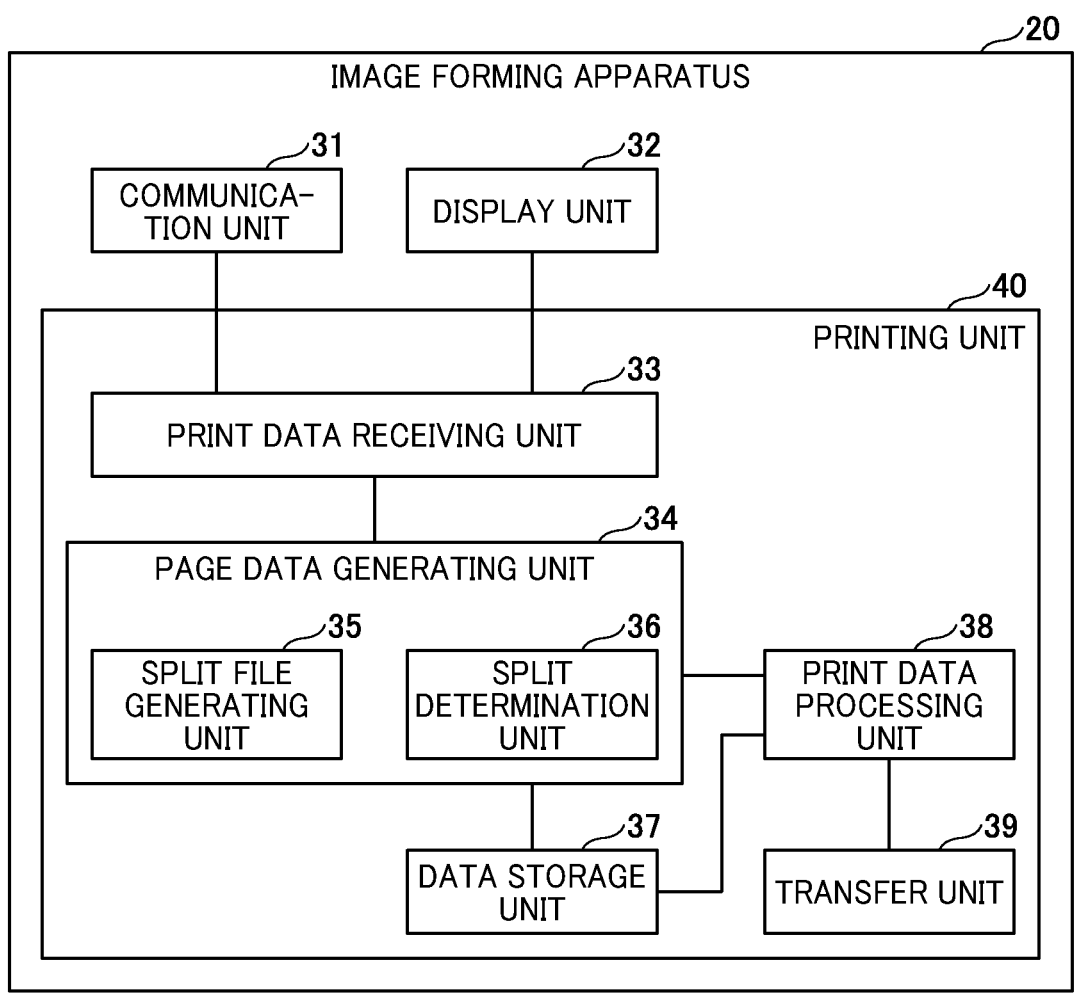
FIG. 13 is a block diagram illustrating functions of an image forming apparatus according to an embodiment of the present disclosure.

FIG. 13 is a block diagram illustrating functions of the image forming apparatus 20 according to the present embodiment. The image forming apparatus 20 of the present embodiment includes a communication unit 31, a display unit 32, and a printing unit 40. The functions of these units are implemented by operation of any of the constituent element illustrated in FIG. 3 according to the instruction given by the CPU 201 based on programs and applications of the image forming apparatus 20 stored in the ROM 202 and executed in the RAM 203. Further, the image forming apparatus 20 has a storage unit 2000 implemented by the ROM 202, the RAM 203, the NVRAM 204, or the HDD 205.

The communication unit 31 receives the PDF file from the cloud service 50 or the terminal 10. The display unit 32 receives an instruction from the user through the touch panel and displays a message to inform the user.

The printing unit 40 executes a printing process based on a print instruction and the PDF file (print data) received by the communication unit 31. The printing unit 40 further includes a print data receiving unit 33, a page data generating unit 34 (split file generating unit 35, and split determination unit 36), a data storage unit 37, a print data processing unit 38, and a transfer unit 39.

From among the data received by the communication unit 31, the print data receiving unit 33 receives the PDF file (print data) passed to the printing unit 40 and instructs the page data generating unit 34 to print.

The page data generating unit 34 further includes a split file generating unit 35 and a split determination unit 36, and splits and generates the PDF files. The split determination unit 36 reads the header Phi of the PDF file and when the split determination unit 36 detects identification information, the split determination unit 36 determines that the split PDF file can be generated, and informs the split file generating unit 35. When the split determination unit 36 determines that it is possible to generate the split PDF file, the split file generating unit 35 splits the PDF file converted by the cloud service 50 or the terminal 10 into the PDF file for each page. Therefore, the page data generating unit 34 corresponds to the page data generating unit 2210 of the first embodiment.

The page data generating unit 34 stores the PDF file that is split or not split in the data storage unit 37.

The print data processing unit 38 analyzes the PDF file stored in the data storage unit 37 and creates a print image or print data described in Printer Description Language (PDL). The transfer unit 39 forms the created print image on a sheet material such as paper.

Figure 14:
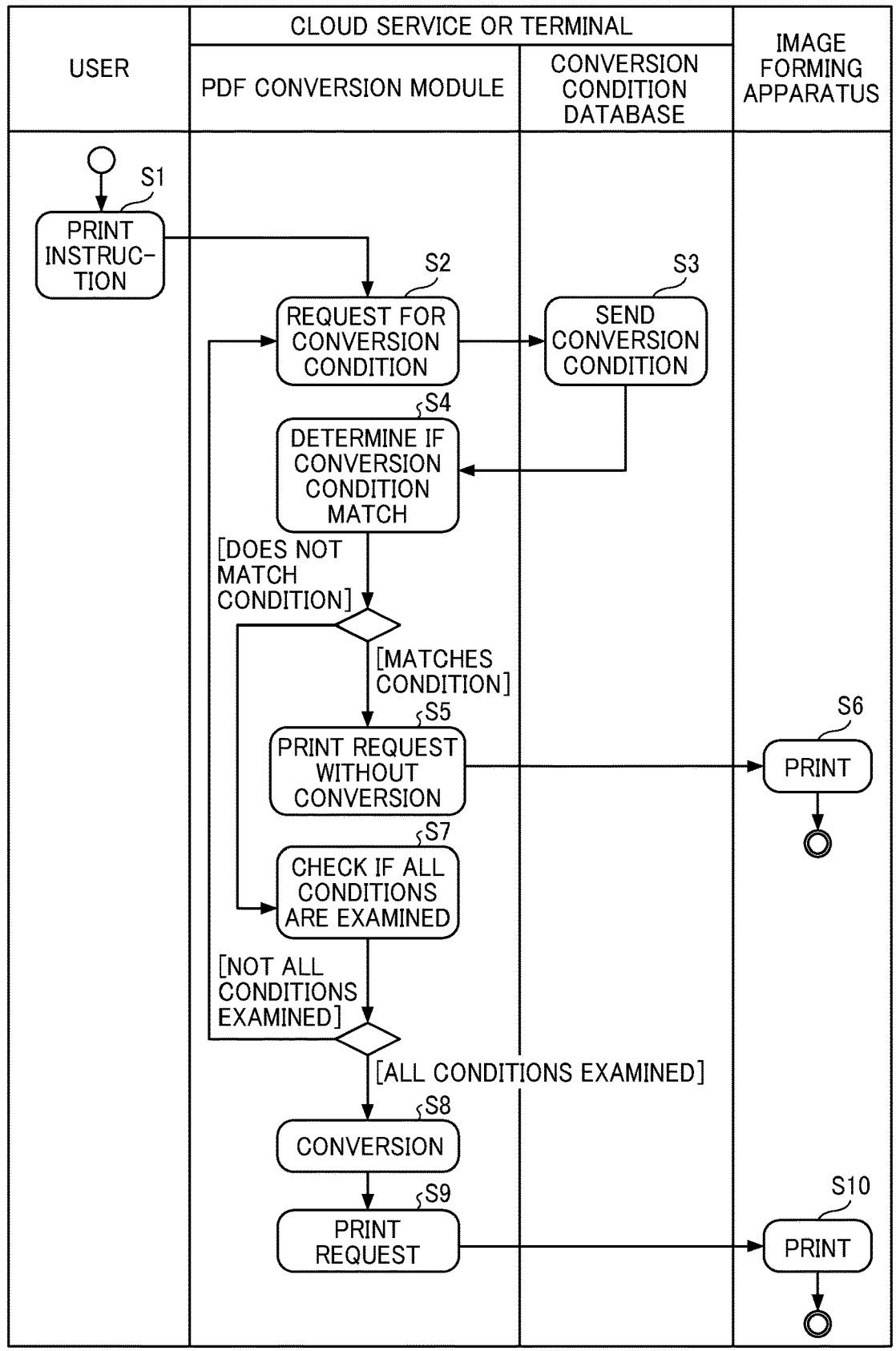
FIG. 14 is a sequence diagram illustrating processes of printing performed by a communication system according to an embodiment of the present disclosure.

FIG. 14 is a sequence diagram illustrating the printing processes performed by the communication system 1, according to the present embodiment.

First, a user instructs to print (step S1). The user accesses the cloud service 50 from the terminal 10 and instructs to print the PDF file or operates the terminal 10 and instructs to print the PDF file. The communication unit 21 of the cloud service 50 or the display unit 22 of the terminal 10 receives the print instruction. The PDF file is stored in the PDF file storage unit 23, and the data processing unit 24 sends the PDF file to the PDF conversion module 25.

The conversion determination unit 26 requests the conversion conditions from the conversion condition database 28 (step S2).

The conversion condition database 28 sends the conversion condition to the conversion determination unit 26 (step S3).

The conversion determination unit 26 determines whether or not the PDF file matches the conversion condition sent from the conversion condition database 28 (step S4).

When any of the conditions match, the PDF conversion unit 27 transmits the PDF file as it is to the data processing unit 24 without converting the file into the split PDF file (step S5).

The data processing unit 24 transmits the PDF file to the image forming apparatus 20 via the communication unit 21, and the image forming apparatus 20 prints the PDF file (step S6).

When the PDF file to be printed does not match the conversion conditions, the conversion determination unit 26 determines whether or not all the conversion conditions are examined, and when not all the conditions are examined, the conversion determination unit 26 requests for the next conversion condition from the conversion condition database 28 (step S7). This is because a plurality of conversion conditions is stored in the conversion condition database 28.

As a result of checking all the conversion conditions, when all the conversion conditions do not match, the PDF conversion unit 27 converts the PDF file to be printed into the split PDF file (step S8).

The cloud service 50 or the data processing unit 24 of the terminal 10 generates a print request and instructs the communication unit 21 to transmit the converted PDF file (step S9).

The communication unit 21 transmits the print request and the PDF file to the image forming apparatus 20, and the communication unit 31 of the image forming apparatus 20 receives the request (step S10). The printing unit 40 determines whether or not it is necessary to split the PDF file into each page, and when necessary splits the PDF file before printing, and when not necessary, the printing unit 40 prints the PDF file as it is.

As described above, in the present embodiment, when a determination is made that it is more efficient to print without converting the PDF file, the PDF file is printed as it is, and the printing time can be shortened.

Setting of Conversion Conditions by User

The user can designate the value of a part of the conversion conditions. The method of specifying the conversion conditions is described with reference to FIG. 15 and FIG. 16.

FIG. 15 is a diagram illustrating conversion conditions that can be designated by the user, according to the present embodiment. In FIG. 15, a lower limit value and an upper limit value are described in association with each of the number of pages, the number of objects, the file size, and the number of fonts. The lower limit value and the upper limit value of the following conditions can be set. The smallest and the largest numbers of pages of the PDF file can be specified. The smallest and the largest numbers of objects in the PDF file can be specified. The smallest and the largest size of the PDF file can be specified. The smallest and the largest numbers of fonts embedded in the PDF file can be specified. When each value is 0 or unspecified, it indicates that there is no restriction.

For example, when the conversion conditions are specified as in the table of FIG. 15, the conversion conditions that the PDF conversion module 25 can extract from the conversion condition database 28 are as follows. The number of pages of the PDF files that are not subject to conversion is 2 or less. That is, when the number of pages of the PDF file is 2 or less, the PDF file is not subject to conversion. The number of objects of the PDF files that are not subject to conversion is 10 or less. That is, when the number of objects in the PDF file is 10 or less, the PDF file is not subject to conversion. The file size of the PDF files that are not subject to conversion is 1000 kilobytes (kbytes). That is, when the file size of the PDF file is 1000 kbytes or less, the PDF file is not subject to conversion. The number of fonts embedded in the PDF file to be converted is 5000 or less. That is, if the number of fonts embedded in the PDF file is 5000 or less, the PDF file is not subject to conversion.

FIG. 16 is a diagram illustrating an input screen where conversion conditions that can be designated by the user are input, according to the present embodiment. FIG. 16 is a screen displayed on the cloud service 50 or the terminal 10 for the user to designate the range of the conversion conditions of the PDF file. The input screen 501 for the conversion conditions is designed so that upper and lower limits can be specified for each of the number of pages, the number of objects, the file size, and the number of fonts. As in FIG. 15, inputting 0 or nothing (blank) indicates that there is no restriction.

In the example of FIG. 16, since the lower limit of the number of pages is 0 and the upper limit is 2, the PDF file with 2 pages or less is not converted. Other than the number of pages, when the number of objects is 10 or less, the file size is 1 Mbyte or less, and the font number is 5000 or less, the PDF file is not converted. In this way, the user can set an arbitrary value as the conversion condition.

As described above, when the PDF file matching the preset conversion conditions is printed, the communication system 1 of the present embodiment prints the PDF file without converting the PDF file into a format that can be processed sequentially, resulting in shortened printing time. Also, the conversion conditions can be set by the user.

Supplementary Explanation

The programs for the terminal 10, the image forming apparatus 20, and the cloud service 50 may be recorded in a computer-readable recording medium and distributed by a file in installable format or executable format. As another example of the recording medium, Compact Disk Recordable (CD-R), Digital Versatile Disk (DVD), Blu-ray Disc, and the like can be mentioned. In addition, the above-mentioned recording medium or a hard disk (HD) in which these programs are stored can be provided as a program product.

Further, the terminal 10, the image forming apparatus 20, and the cloud service 50 in the above embodiment may be configured as a single apparatus, or a plurality of apparatuses arbitrarily assigned by dividing each function.

Each function of the above-described embodiment can be realized by one or a plurality of processing circuits. Here, the "processing circuit" in the present disclosure can be a processor programmed to execute each function by software such as a processor including an electronic circuit, and a processor programmed to execute the above-described functions by an application specific integrated circuit (ASIC) and conventional circuit modules and the like.

The conversion determination unit 26 is an example of a determination unit, the display unit 22 is an example of a display control unit, and the conversion condition database 28 is an example of a conversion condition storage unit.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing device comprising:
    processing circuitry configured to,
        generate a second document file from a first document file, the first document file including data of a plurality of pages and being in a random access format, by
            inserting header identification information specifying the second document file may be split by page,
            inserting boundary identification information identifying a boundary of the data associated with a respective one of the plurality of pages, and
            rearranging the data of the plurality of pages into page order, and transmit the second document file to an image forming apparatus.

2. The information processing device of claim 1, wherein the processing circuitry is configured to insert the boundary identification information by, for each page, rearranging an element constituting data of the respective one of pages to a beginning or to an end of the data of the respective one of the pages to indicate the boundary of the data of the respective one of the pages.

3. The information processing device of claim 1, wherein the processing circuitry is configured to insert the boundary identification information by, for each page, inserting a comment at a beginning or at an end of the data of the respective one of the pages to indicate the boundary of the data of the respective one of the pages.

4. The information processing device of claim 1, wherein the processing circuitry is configured to generate the second document file by inserting arrangement information therein, the arrangement information indicating that the data of the plurality of pages is arranged in page order.

5. The information processing device of claim 4, wherein the processing circuitry is configured to,
    determine whether the arrangement information is included in the first document file, and
    selectively perform one of generating the second document file or transmitting the first document file to the image forming apparatus based on whether the arrangement information is included in the first document file.

6. The information processing device of claim 1, wherein the processing circuitry is configured to transmit the second document file to the image forming apparatus such that the data associated with the second document file is transmitted sequentially as the data is generated.

7. The information processing device of claim 6, wherein the processing circuitry is configured to sequentially transmit the second document file to the image forming apparatus each time the data of one page in the plurality of pages is generated.

8. The information processing device of claim 6, wherein the processing circuitry is configured to sequentially transmit a set size of the data associated with the second document file to the image forming apparatus each time data of the set size is generated.

9. The information processing device of claim 1, further comprising:
    a memory configured to store conversion conditions indicating whether to convert the first document file into the second document file, and wherein
    the processing circuitry is configured to determine whether to generate the second document file based on the conversion conditions stored in the memory.

10. The information processing device of claim 9, wherein the processing circuitry is configured to display a screen to set the conversion conditions.

11. A communication system comprising:
    the information processing device of claim 1, and
    the image forming apparatus, wherein the image forming apparatus includes a memory and second processing circuitry configured to,
        store the second document file in the memory as a buffer,
        determine whether the second document file may be split into each page by detecting the header identification information, without waiting for the second document file to be completely stored in the memory, generating a third document file for each page, without waiting for the second document file to be completely stored in the memory.

12. The communication system of claim 11, wherein the image forming apparatus includes second processing circuitry configured to,
    generate a third document file by splitting the data associated with each page from the second document file, and
    print the third document file.

13. A non-transitory recording medium storing a plurality of instructions which, in response to execution by one or more processors, causes the one or more processors to,
    generate a second document file from a first document file, the first document file including data of a plurality of pages and being in a random access format, by
    inserting header identification information specifying the second document file may be split by page,
    inserting boundary identification information identifying a boundary of the data associated with a respective one of the plurality of pages, and
    rearranging the data of the plurality of pages into page order, and transmit the second document file to an image forming apparatus.

14. The non-transitory recording medium of claim 13, wherein the instructions, when executed, configure the one or more processors to insert the boundary identification information by, for each page, rearranging an element constituting data of the respective one of pages to a beginning or to an end of the data of the respective one of the pages to indicate the boundary of the data of the respective one of the pages.

15. The non-transitory recording medium of claim 13, wherein the instructions, when executed, configure the one or more processors to insert the boundary identification information by, for each page, inserting a comment at a beginning or at an end of the data of the respective one of the pages to indicate the boundary of the data of the respective one of the pages.

16. The non-transitory recording medium of claim 13, wherein the instructions, when executed, configure the one or more processors to generate the second document file by inserting arrangement information therein, the arrangement information indicating that the data of the plurality of pages is arranged in page order.

17. The non-transitory recording medium of claim 16, wherein the instructions, when executed, configure the one or more processors to,
    determine whether the arrangement information is included in the first document file, and
    selectively perform one of generating the second document file or transmitting the first document file to the image forming apparatus based on whether the arrangement information is included in the first document file.

18. The non-transitory recording medium of claim 13, wherein the instructions, when executed, configure the one or more processors to transmit the second document file to the image forming apparatus such that the data associated with the second document file is transmitted sequentially as the data is generated.

19. The non-transitory recording medium of claim 13, wherein the instructions, when executed, configure the or more processors to sequentially transmit the second document file to the image forming apparatus each time the data of one page in the plurality of pages is generated.

20. An image forming apparatus comprising:
    a memory; and
    processing circuitry configured to,
        store a first document file in the memory as a buffer,
        determine whether the first document file may be split into each page by detecting header identification information, without waiting for the first document file to be completely stored in the memory,
        generate a second document file from the first document file by splitting the data associated with each page from the first document file, without waiting for the first document file to be completely stored in the memory, and
        print the second document file.

* * * * *